Sept. 25, 1956  C. W. BRAATZ  2,764,350
PREDETERMINING COUNTERS

Filed Jan. 5, 1953  2 Sheets-Sheet 1

INVENTOR.
C. W. Braatz
BY
Lieber & Lieber
ATTORNEYS.

Sept. 25, 1956  C. W. BRAATZ  2,764,350
PREDETERMINING COUNTERS
Filed Jan. 5, 1953  2 Sheets-Sheet 2

INVENTOR.
C. W. Braatz
BY
Lieber & Lieber
ATTORNEYS.

United States Patent Office 2,764,350
Patented Sept. 25, 1956

2,764,350

PREDETERMINING COUNTERS

Clarence W. Braatz, Milwaukee, Wis., assignor to Durant Manufacturing Co., Milwaukee, Wis., a corporation of Wisconsin Application January 5, 1953, Serial No. 329,711

4 Claims. (Cl. 235—132)

This invention relates generally to improvements in mechanisms for automatically counting a predetermined number of operations or events, and relates more specifically to improvements in the construction and operation of so-called predetermining counters which may be pre-set to actuate a signal or to arrest the operation of a machine with which the counter is associated, whenever a definite number of counts have been recorded by the counting device.

The primary object of the present invention is to provide various improvements in the construction of predetermining counters, whereby such devices may be more conveniently pre-set to function properly, and they may also be more effectively reset to start a new count after a predetermined count has been attained.

It has heretofore been common practice to provide certain types of machines with predetermining counters having coaxial numeral wheels of successively higher order which could be pre-set to actuate a signal or to stop the machines, upon completion of a predetermined number of operations, and which could also be reset to repeat the same or any other predetermined number of counts. In this type of counter the numeral wheels are ordinarily freely rotatable about a normally fixed reset shaft with which an electric switch mechanism is directly associated, and which is manually rotatable to return all of the wheels to zero position. When the wheels of such a predetermining counter reach the predetermined counting position, they usually actuate the electric switch adapted to either operate a signal or to stop the machine with which the counter is associated, and with the prior devices, this switch is reversely operated whenever the reset shaft is initially rotated to effect resetting and before all of the wheels have been zeroized. This action is exceedingly objectionable since it results in loss of counts or in inaccurate subsequent counting.

Then too, in these prior counters each numeral wheel was built up of a number of coacting laminations or disks and the predetermining ring which is rotatably adjustable relative to each numeral wheel is adapted to be locked in various positions of adjustment by a small square plunger which is urged into spaced notches within the ring by a delicate leaf spring confined between laminations of the numeral wheel. This type of wheel assemblage was not only difficult to assemble, but it was also costly and relatively frail, especially in the smaller sizes, and the delicate leaf springs would also break frequently or become otherwise ineffective.

It is therefore an important object of my present invention to provide an improved predetermining counter of the above mentioned type, which obviates all of the objectionable features noted, and which is more durable, reliable, and accurate in operation.

Another important objeact of this invention is to provide improved resetting mechanism for a predetermining counter associated with an electrical control switch for a signal or a machine, in which the resetting device does not coact directly with the reset shaft and therefore does not actuate the switch until all of the numeral wheels have been reset.

A further important object of the invention is to provide an improved predetermined counting unit in which the numeral wheels are reversely rotatable at the will of the operator without obstruction by the resetting mechanism, in order to compensate for overtravel of the wheels when the counter is associated with certain types of machines.

Still another important object of my invention is to provide an improved predetermining counter wheel assemblage which is simple and sturdy in construction, and conveniently manipulable to effect pre-setting of the predetermining ring.

An additional object of the present invention is to provide a simple, compact and efficient predetermined counter and control switch assemblage which may be readily manufactured and assembled in various sizes and for diverse uses, and at moderate cost.

These and other more specific objects and advantages of the invention will be apparent from the following detailed description from which it will be apparent that the gist of the improvement is the provision of an improved resetting assemblage for a predetermining counter which functions to actuate the control switch or other devices operable by the counter only after each resetting operation has been completely effected, and wherein the predetermining and counting wheels are simple and durable in structure and may be conveniently assembled and pre-set.

A clear conception of the features constituting the present invention, and of the construction and operation of a typical predetermining counter embodying the invention, may be had by referring to the drawings accompanying and forming a part of this specification wherein like reference characters designate the same or similar parts in the various views.

Figure 2:
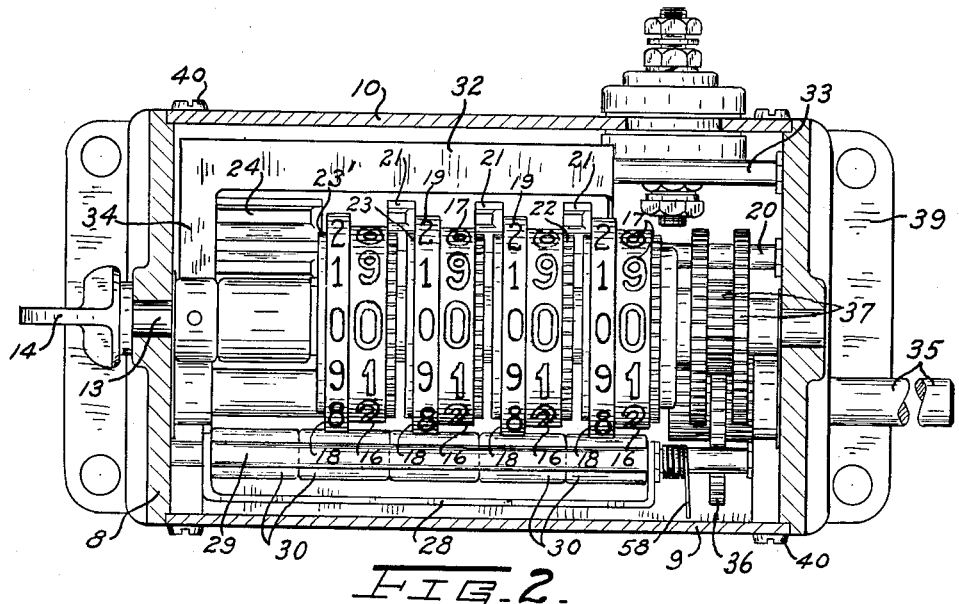
Fig. 2 is a top view of the internal mechanism of the four wheel predetermining counter shown in Fig. 1, an approximately central horizontal section having been taken through the casing and its opposite side closure plates.
Figure 1:
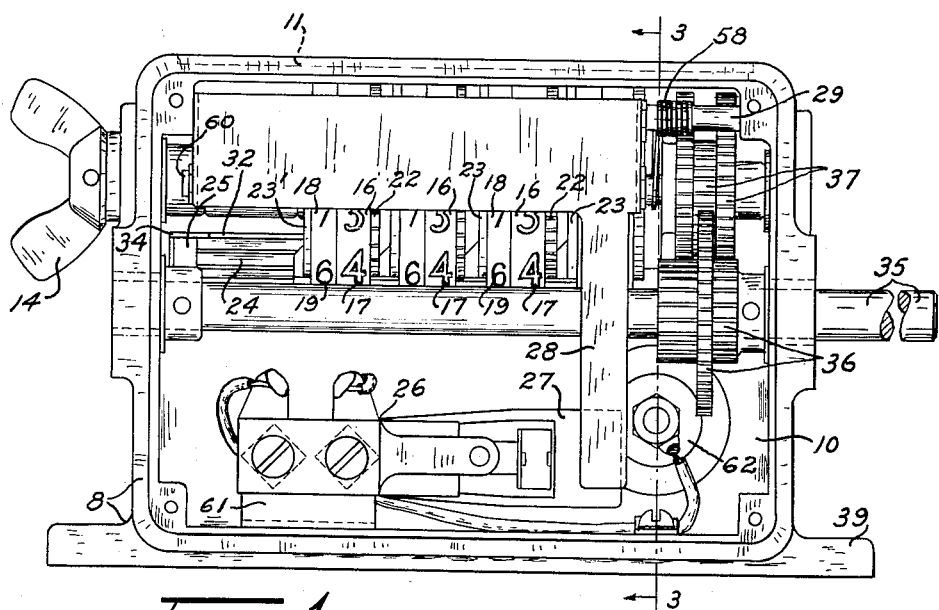
Fig. 1 is a side elevation of a four wheel rotary predetermining counter with one of the casing closure plates removed and looking toward the electrical control switch normally housed and concealed within the casing.

While the invention has been shown and described herein as having been embodied in a four wheel rotary predetermining counter adapted to actuate an electrical control switch confined directly within the wheel housing casing, it is not the intent to unnecessarily restrict the utility of the improved features by virtue of this limited embodiment; and it is also contemplated that specific descriptive terms employed herein be given the broadest possible interpretation consistent with the actual disclosure.

Referring to the drawings, the typical commercial predetermining counter shown comprises in general, a main housing casing 8 having opposite removable side closure plates 9, 10 of which the plate 10 is provided with a hinged cover 11 having an elongated sight opening 12 therein; a normally stationary reset shaft 13 rotatably mounted in the opposite end walls of the casing 8 and having a manually rotatable thumb nut 14 secured to one of its ends while its medial portion spans the upper casing interior and has a groove 15 formed therein; four similar coaxial predetermining counter wheel assemblages of progressively higher order normally freely rotatable upon the reset shaft 13 and each having a unitary numeral wheel 16 provided with a series of peripheral numerals 17 increasing in one direction, and also having a predetermining ring 18 provided with a like series of peripheral numerals 19 increasing in the opposite direction, the ring 18 being rotatably adjustable relative to its carrying wheel 16; a transfer pinion shaft 20 spanning the casing 8 beneath the reset shaft 13 and having a series of rotary transfer pinions 21 rotatable thereabout and cooperating with pawl carrying gears 22 and with single tooth transfer disks 23 carried by the adjacent ends of the successive numeral wheels 16; a special longer reset pinion 24 also rotatable about the shaft 20 and having a square cam 25 secured to one end thereof while the opposite ends of its teeth are cooperable with the single tooth transfer disk 23' carried by the numeral wheel 16 of highest order; a control device such as an electric switch assemblage 26 mounted within the lower portion of the casing 8 and having an oscillatory contact actuating arm 27; a lever 28 swingably suspended at its upper end upon a pivot shaft 29 while its lower swinging end is engageable with one side of the switch arm 27 and its medial portion carries a series of rollers 30 which are cooperable with peripheral local notches 31 in the predetermining rings 18 whenever a predetermined count has been attained; another lever 32 swingably suspended at its medial portion from a pivot shaft 33 while its upper flat end 34 is cooperable with the cam 25 and its lower swinging end is engageable with the opposite side of the switch arm 27; and a driving shaft 35 journalled in the casing end walls beneath the reset shaft 13 and having thereon gears 36 meshing with gears 37 rotatable upon the reset shaft 13 and which are drivingly cooperable with the numeral wheel 16 of lowest order.

Figure 4:
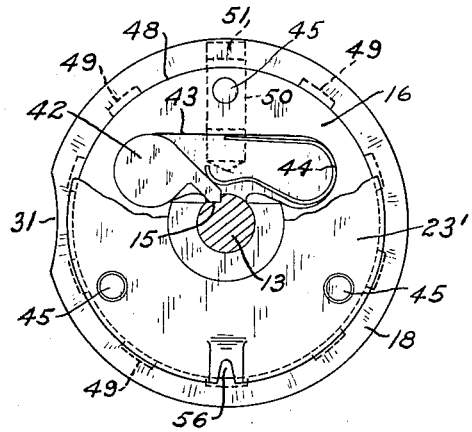
Fig. 4 is an enlarged end view of one of the improved predetermining numeral wheel assemblages of the counter shown in Figs. 1 to 3 inclusive, looking toward the single tooth rotary motion transfer disk thereof the upper portion of which has been broken away.
Figure 3:
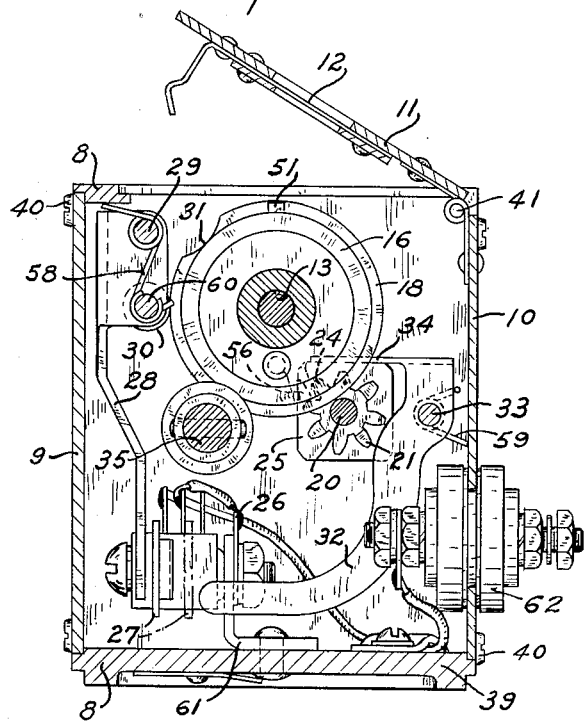
Fig. 3 is a vertical section through the counter shown in Figs. 1 and 2, showing the top cover partially open, the section having been taken along the line 3—3 of Fig. 1.

The main casing 8 of the counter is preferably of unitary metal construction with the end walls formed integral with a suitable supporting base 39 upon which the switch 26 is mounted, and the closure plates are detachably secured to the casing 8 by screws 40 while the cover 11 is connected to the plate 10 by a hinge 41, as shown in Fig. 3. The normally stationary reset shaft 13 is manually rotatable by means of the thumb nut 14 or the like, whenever the counter is to be reset, and the groove 15 extends only throughout the portion of the shaft 13 upon which the numeral wheels 16 are mounted and is adapted to coact with pawls 42 swingably confined within cavities 43 in the wheels 16 and which are urged toward the shaft 13 by leaf springs 44, as illustrated in Fig. 4. There may be any desired number of numeral wheels 16 provided, depending upon the use which is to be made of the counter, and the predetermining counter wheel assemblages of progressively increasing order are all of substantially similar construction.

Figure 5:
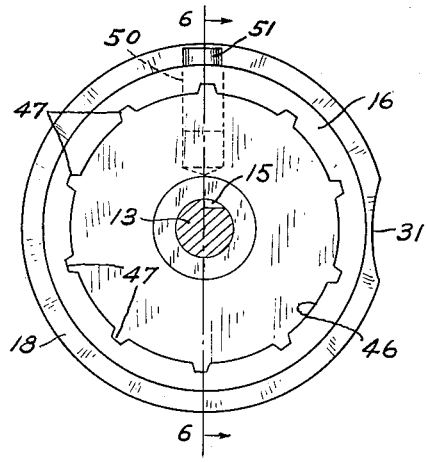
Fig. 5 is a similarly enlarged opposite end view of the same numeral wheel assemblage with the ratchet gear and pawls omitted.
Figure 6:
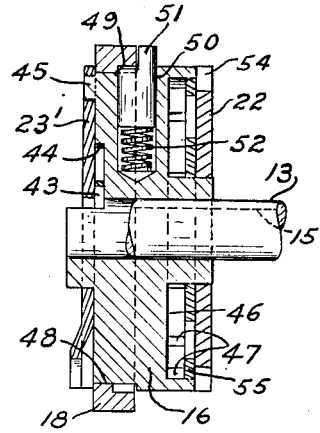
Fig. 6 is a likewise enlarged central vertical section through the complete predetermining numeral wheel assembly of Figs. 4 and 5, the section having been taken along the line 6—6 of Fig. 5.

As shown in Figs. 4, 5 and 6, each of these improved predetermining counter wheel assemblages comprises the one-piece metal numeral wheel 16 having the cavity 43 and three integral lugs 45 at one end, and a socket 46 provided with an annular series of detents 47 at its opposite end, while its periphery is provided with the numerals 17 and with an annular cylindrical bearing surface 48 for the predetermining ring 18. The predetermining ring 18 which is provided with the peripheral numerals 19, has its interior provided with an annular series of recesses 49 and is rotatable for adjustment upon the surface 48, and the corresponding solid numeral wheel 16 has a radial bore 50 therein within which a plunger 51 is slidably confined. The inner end of each plunger 51 is engaged by a helical compression spring 52 while its outer end portion has one half engageable with the ring recesses 49 to lock the ring 18 to the wheel 16, and has its other half extended outwardly to permit release of the plunger 51 whenever relative predetermining adjustment of the ring and wheel is being effected.

There are ten equally spaced numerals on each wheel 16 and ring 18, but the numerals 17 of each wheel 16 are progressively greater in one direction while the numerals 19 of the corresponding ring 18 are progressively greater in the opposite direction, and there are also ten equally spaced internal locking recesses 49 in each ring 18. The pawl carrying gear 22 of each wheel assemblage has an annular series of peripheral teeth 54 cooperable with the teeth of an adjacent transfer pinion 21 and carries a pair of diametrically opposite resilient pawls 55 cooperable with the internal detents 47 of the adjacent numeral wheel 16, and each of the motion transfer disks 23, 23' has a single tooth 56 also cooperable with the adjacent transfer pinion 21, 24. Each of the disks 23 is also provided with a series of three holes adapted to receive the lugs 45 of the adjacent wheel 16 thus providing a positive drive between the disk and wheel, and the disks 23 also retain the pawls 42 and springs 44 within the cavities 43, while also retaining the rings 18 upon the wheel surfaces 48.

The four sided cam 25 is rigidly attached to an end of the special transfer pinion 24 which is cooperable with the tooth 56 of the transfer disk 23' of the numeral wheel of highest order, and the switch actuating lever 28 which is swingably suspended from the pivot shaft 29 and carries the rollers 30, is constantly urged to swing in a counter-clockwise direction as viewed in Fig. 3, by a coil spring 58 in order to maintain the rollers 30 in contact with the rings 18; while the switch actuating lever 32 which is swingably suspended from the pivot shaft 33 is constantly urged in a like direction so as to maintain its end 34 in contact with the cam 25, by a similar spring 59. The predetermining rollers 30 are journalled for free rotation about a shaft 60 mounted upon the lever 28, and the electric switch 26 is mounted upon a bracket 61 secured to the casing base 39 and has one terminal grounded while its other terminal is connected through an insulating bushing 62 mounted in the closure plate 10, to an electric signal such as a light, or to a relay for controlling the machine with which the counter is associated. The switch 26 which is confined entirely within the casing 8, may be of any suitable type either adapted to close or to open the electric circuit when its actuating arm 27 is engaged by the lever 28, or adapted to open or to close the circuit whenever its actuating arm 27 is engaged by the other lever 32.

The driving shaft 35 of the counter may be either continuously or intermittently rotated in one direction, or it may be oscillated by suitable stroke mechanism to drive the numeral wheels 16 in order to aline the numerals 17 and to make them visible through the sight opening 12, and when the improved predetermining counter has been properly installed its operation is as follows: Before a counting operation is started, the cover 11 should be opened so that the numerals 19 of the predetermining rings 18 may be pre-set with the aid of the individual plungers in order to cause the electric switch actuated signal to function, or the machine controlled by the switch 26 to stop, when a predetermined count has been reached. The counter wheels 16 should be in zero reading position, and the driving shaft 35 may then be actuated to cause the numerals 17 of the wheels 16 to rotate and to register the successive counts through the opening 12; and when the predetermined count has been attained, all of the peripheral notches 31 of the predeterming rings 18 will become alined and the rollers 30 will move into the adjacent alined notches 31 thereby causing the lever 28 to swing into engagement with the arm 27 and to move this arm from the solid line position to the dot-and-dash line position shown in Fig. 3, and to thus actuate the control switch 26 so as to stop the counter and either give the signal or stop the machine.

In order to reset the counter wheels 16 to zero reading and the predetermining rings 18 to predetermined total reading, it is only necessary to rotate the reset shaft 13 in a counter clockwise direction as viewed in Fig. 4 whereupon the pawls 42 will engage the shaft recess 15 and will eventually return all of the wheels 16 and rings 18 to starting position. During such resetting operation, the switch arm 27 will not be engaged by the lever 32 and returned from dot-and-dash to solid line position as in Fig. 3, until after the single tooth 56 of the disk 23' on the counter wheel 16 of highest order has been engaged by the special reset pinion 24 and the latter has actuated the polygonal cam 25 which contacts the flat lever end 34. The control switch 26 is thus operated only after all of the numeral wheels 16 have been reset to zero, even if the counter continues to operate due to some contingency such as overtravel of stock passing through the controlled machine. With the counter thus finally reset, it is ready for subsequent predetermined registration of counts and actuation of the switch 26.

From the foregoing detailed description of the construction and operation of the typical unit, it will be apparent that the present invention in fact provides an improved predetermining counter which is exceedingly simple, compact and durable in structure, and which is also accurate in performance and highly efficient in operation. By associating the switch actuating cam 25 with the transfer pinion supporting shaft 20 instead of directly with the reset shaft as in the past, rotation of the reset shaft 13 positively will not cause this cam to actuate the control switch 26 until after all of the wheels 16 have been reset to zero. In the prior predetermining counters, rotation of the reset shaft in order to reset the numeral wheels caused the switch to operate as soon as the numeral wheel of lowest order has been zeroized thus producing inaccurate count registration. Then too, the present improved reset mechanism is far simpler and sturdier than the prior reset devices, and permits the counter wheels to be operated either continuously or intermittently, and to be rotated in either direction.

The improved predetermining wheel assembly is also a vast improvement over the prior art wheels wherein the numeral wheels were made in sections between which the locking plungers and their leaf springs were confined. In the improved assembly each complete wheel 16 is accurately produced from a one-piece die casting having a bore 50 within which the lock plunger 51 is slidably confined and in which the helical spring 52 is also concealed. The cylindrical plunger 51 can be readily constructed of round wire stock and the helical spring 52 is much stronger and more durable than the former leaf springs utilized for similar purposes, thus insuring positive locking of the ring 18 in various adjusted positions. The improved predetermining wheels and rings may also be more readily assembled. These improved assemblages because of their simplicity can also be expeditiously manufactured in very small sizes to insure accurate performance.

The improved predetermining counters may be produced with any desired number of the wheel assemblages, and both these assemblages and the improved resetting mechanism have proven highly satisfactory and successful in actual use.

It should be understood that it is not desired to limit this invention to the exact details of construction and operation of the predetermining counter specifically shown and described, for various modifications within the scope of the appended claims may occur to persons skilled in the art.

I claim:

1. In a predetermining counter, a succession of counting wheels of progressively higher order each having a series of peripheral numerals, a predetermining ring normally rotatable with each of said wheels and each having a series of peripheral numerals rotatably adjustable relative to its rotating wheel, a normally stationary reset shaft supporting all of said wheels, transfer pinions mounted upon a common shaft and coacting with the successive counting wheels remote from said reset shaft, an electric switch actuable in one direction by said rings whenever the latter register a predetermined total count, a reset pinion also mounted upon said transfer pinion shaft, and a cam rotatable by said reset pinion during resetting of said wheels by said reset shaft to actuate said switch in the opposite direction only after the wheel of highest order has been reset.

2. In a predetermining counter, a succession of counting wheels of progressively higher order each having a series of peripheral numerals, a predetermining ring normally rotatable with each of said wheels and each having a peripheral notch rotatably adjustable relative to its rotating wheel, a normally stationary reset shaft supporting all of said wheels, transfer pinions mounted upon a common shaft and coacting with the successive counting wheels remote from said reset shaft, a lever engageable with all of said ring notches whenever a total predetermined count is registered by said wheels, a device operable by said lever whenever the latter engages all of said notches, a reset pinion also mounted upon said transfer pinion shaft, a cam operable by said reset pinion, and another lever operable by said cam to reversely operate said device only after said reset shaft has been actuated to reset the counting wheel of highest order.

3. In a predetermining counter, a succession of counting wheels of progressively higher order each having a series of peripheral numerals, a predetermining ring normally rotatable with each of said wheels and each having a peripheral notch and a series of peripheral numerals rotatably adjustable relative to its rotating wheel, a normally stationary reset shaft supporting all of said wheels, transfer pinions mounted upon a common shaft and coacting with the successive counting wheels remote from said reset shaft, a lever having rollers engageable with all of said notches to cause the lever to swing whenever a predetermined count is registered by said wheels, an electric switch actuable in one direction by said swinging lever, a reset pinion also mounted upon said transfer pinion shaft, a cam rotatable directly by said reset pinion during resetting of said wheels by said reset shaft, and another lever movable by said cam to actuate said switch in the opposite direction only after the wheel of highest order has been reset.

4. In a predetermining counter, a succession of counting wheels of progressively higher order each having a series of peripheral numerals, a predetermining ring normally rotatable with each of said wheels and each having a peripheral notch and a series of numerals and being rotatably adjustable relative to its rotating wheel, a normally stationary reset shaft rotatably supporting all of said wheels and rings, a pinion shaft disposed parallel to said reset shaft beyond the peripheries of said wheels and rings, transfer pinions rotatable upon said pinion shaft and drivingly interconnecting the successive numeral wheels, a switch mechanism actuatable in one direction by said rings whenever the latter register a predetermined total count, a reset pinion also rotatable upon said pinion shaft, and a cam rotatable about said pinion shaft by said reset pinion during resetting of said wheels by said reset shaft to actuate said mechanism in the opposite direction only after the numeral wheel of highest order has been reset.

References Cited in the file of this patent

UNITED STATES PATENTS

| | | |
|---|---|---|
| 1,592,568 | Orth | July 13, 1926 |
| 1,615,399 | Orth | Jan. 25, 1927 |
| 2,040,027 | Northrop | May 5, 1936 |
| 2,581,859 | Hoye | Jan. 8, 1952 |